April 9, 1963
D. W. TURNER
3,085,128
ELECTRICAL INSULATOR BUSHING
Filed Feb. 17, 1961
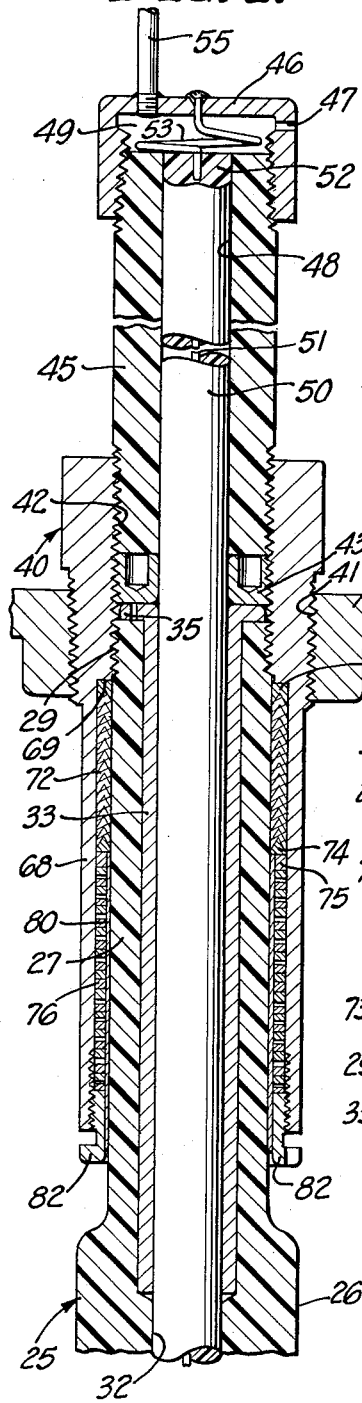
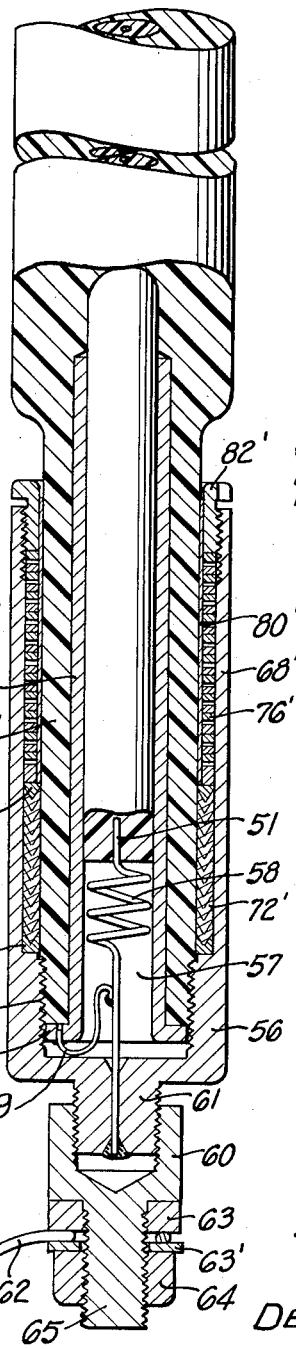
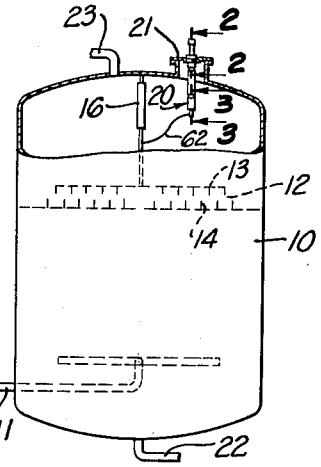
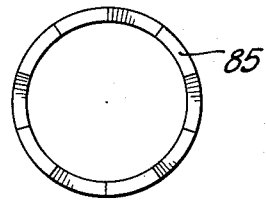
INVENTOR
DELBER W. TURNER
BY HIS ATTORNEYS
HARRIS, KIECH, RUSSELL & KERN United States Patent Office 3,085,128
Patented Apr. 9, 1963

3,085,128
ELECTRICAL INSULATOR BUSHING
Delber W. Turner, Houston, Tex., assignor to Petrolite Corporation, Wilmington, Del., a corporation of Delaware
Filed Feb. 17, 1961, Ser. No. 89,948
16 Claims. (Cl. 174—18)

My invention relates to high-voltage insulation for electrical equipment and is particularly suited to such equipment that must operate at high temperature and under high superatmospheric pressure. It will be exemplified as applied to a high-voltage inlet bushing for such equipment.

The present invention is an improvement on the structure shown in my earlier Patent No. 2,924,637. As pointed out therein, certain types of electric equipment require electric insulation that will operate without short-circuiting or substantial surface conductivity when disposed in an oil zone that contains or communicates with a body of oil carrying substantial amounts of impurities, e.g. water or other dispersed impurties present in the oil. Such problems are encountered, for example, in insulating or conducting high voltages to the electrodes of an electric treater designed to resolve petroleum emulsions. Here the insulation must sometimes operate in a zone containing or communicating with an oil containing an amount of dispersed impurities ranging from several thousandths of a percent up to 1% or more.

At the same time such insulation is often required to maintain its effectiveness over a wide range of temperature and pressures. Some current demands are for insulation that will operate at temperatures of 375° F. or higher, sometimes at pressures as high as 400 p.s.i. or higher.

Ordinary ceramic insulation is not useful under such conditions as described above. A number of plastic materials can be used successfully depending upon their characteristics and the operating conditions. Under the severe conditions noted above the invention preferably uses plastic members made of polytetrafluoroethylene (available under the trademark "Teflon") or polytrifluorochloroethylene (available under the trademark "Kel-F"). These and other waxy-surface plastic materials substantially immune to the impurities of the oil are preferred but it should be understood that other plastic materials can be employed in the invention when designed for operating conditions less severe than those mentioned above.

The insulation must form an effective seal against the high pressures of the oil zone. Such pressures give rise to distinct problems because the aforesaid plastic materials tend to deform by plastic flow when pressure is applied thereto. The problems are multiplied many fold when the insulation must remain effective over a wide range of temperature conditions. The plastic materials most useful in the invention have very high thermal coefficients of expansion, giving rise to problems that would not arise were the coefficients closer to those of other elements of the bushing.

It is an object of the invention to provide continuous electrical insulation under conditions tending to induce plastic flow of a plastic member relied upon for the electrical isolation of two elements.

It is a further object of the invention to provide a high-voltage insulator structure in which the plastic member is substantially self-supporting without requiring the use of separate load-carrying members, the present invention differing in this and other respects from the structure shown in the aforesaid patent.

A further object of the invention is to employ a plastic tubular member in a structure which resists plastic flow thereof under conditions of high pressure.

A further object is to provide an insulator structure which remains sealed even when subjected to temperatures of several hundred degrees Fahrenheit at pressures of several hundred p.s.i.

Such objectives are accomplished by use of a tubular plastic member having at least one neck or end portion extending into a skirt and sealed with respect thereto by packing means compressed by a heavy spring. It is an object of the invention to provide such a structure and to confine the plastic against plastic flow induced by spring pressure or ambient pressure. Another object of the invention is to provide a novel spring capable of exerting large resilient forces in a relatively small space, this spring being an assemblage of spring washer elements.

Further object and advantages of the invention will be evident to those skilled in the art from the following description of an exemplary embodiment, illustrated in the drawing, in which:

FIG. 1 is a diagrammatic view illustrating a piece of electric equipment, exemplified as a high-voltage electric treater for emulsions, equipped with an inlet bushing incorporating the invention;

FIG. 2 is a vertical sectional view of the upper section of the bushing taken along the line 2—2 of FIG. 1;

FIG. 3 is a vertical sectional view of a lower section of the bushing taken along the line 3—3 of FIG. 1;

FIG. 4 is an elevational view of the spring employed in the invention;

FIG. 5 is a side elevational view of one of the spring washer elements employed in making the spring of FIG. 4; and FIG. 6 is a top view of the spring washer element of FIG. 5 taken in the direction of the arrow 6 thereof.

The invention is exemplified in FIG. 1 as applied to a conventional electric emulsion treater including a pressure vessel 10 to which emulsion is supplied by a pipe 11 to be treated in a treating space 12 between a high-voltage electrode 13 and a grounded electrode 14. The electrode 13 is suspended by one or more insulator structures 16 which may be of conventional structure or formed in accordance with the teachings of the invention. The requisite high-voltage potential is applied to the electrode 13 through an insulator structure 20 to be described, this structure being exemplified as an inlet bushing attached to a wall 21 closing an oil zone of the treater, the bushing extending into this oil zone and thus being exposed directly or indirectly to the impurities or contaminants of the oil in the upper portion of the pressure vessel 10. Electric treatment of the emulsion coalesces and separates much of the dispersed aqueous material, which can be withdrawn through a pipe 22, but the treated oil, withdrawn through a pipe 23, often still contains sufficient impurities and contaminants to require specially designed insulation in the upper part of the vessel 10 if short-circuiting is to be avoided and trouble-free operation insured.

As applied to the inlet bushing, the invention includes a plastic tubular member 25, preferably made of one of the aforesaid plastic materials, having a tendency to soften and expand upon increase in temperature and being subject to plastic flow upon increase in pressure within the vessel 10. The tubular member 25 has a central body portion 26 integral with upper and lower end portions or necks 27 and 27' which respectively terminate in upper and lower attachment means shown as threaded ends 29 and 29'. The tubular member 25 has a central passage 32 and is preferably made of a length of thick-walled Teflon tubing machined at its ends to form the smaller necks 27 and 27'.

Upper and lower inner sleeve members 33 and 33' made of metal extend into the respective ends of the central passage 32 and preferably terminate within the central body portion 26 but with their ends substantially spaced from each other. In the preferred arrangement the upper and lower ends of the central passage are counterbored, as shown, and the sleeve members are of such length as to fill the counterbores. The inner sleeve members 33 and 33' respectively provide flanges 35 and 35' extending outward beyond the respective ends of the necks and forming an end wall in engagement therewith.

A collar member 40 supports the tubular member 25 and is in turn supported by the wall 21 in any suitable way. In the exemplified construction an intermediate portion of the collar member 40 is externally threaded and screwed into a correspondingly threaded opening 41 of the wall 21 to close the oil zone. The attachment of the tubular member 25 to the collar member 40 is preferably both direct and indirect. A direct attachment may be provided by screwing the threaded end 29 of the tubular member into the lower end of an internally threaded passage 42 of the collar member. An indirect attachment is effected through the sealing means to be described. A ring-like retainer member 43 is threaded into the passage 42 to engage the flange 35, providing a central opening which is a continuation of the central passage 32.

In the embodiment shown a supplementary or second tubular member 45 has its lower end threaded into the upper end of the passage 42 and its threaded upper end closed by a metal closure 46 in the form of an inverted cup having a small bleed passage 47. This second tubular member 45 is made of any suitable plastic or other insulating material and has a central passage 48 which is aligned with the central passage 32 and opens on a space 49 within the closure 46.

A short length of high voltage cable 50 extends downward in the aligned central passages 48 and 32. This cable is of conventional construction and includes a conductor 51 surrounded by a suitable sheath of insulating material 52 which is cut away to leave exposed a length of the conductor at each end of the cable. At the upper end this exposed end of the conductor is bent into a loop 53 within the space 49 and its end portion is soldered in an opening of the closure 46 after the latter is in place on the upper end of the second tubular member 45. The closure 46 serves as a terminal and is connected to any suitable high-voltage source by a conductor 55 which may be soldered or otherwise connected to the terminal.

The lower end of the tubular member 25 is closed by a metal closure member 56 suitably connected thereto. As shown this closure member is internally threaded to receive the lower threaded end 29' and close a space 57 therein. The lower exposed end of the conductor 51 is looped into one or more turns 58 in this space and has its extreme lower end extending into an opening of the closure member 56 to be soldered thereto after the latter has been screwed onto the tubular member 25. The loops at the ends of the conductor 51 eliminate any stress on the cable or the soldered connections that would otherwise be imposed by the extreme temperature changes to which the plastic tubular member 25 may be exposed. A wire 59 preferably connects the exposed conductor 51 of the cable to the lower inner sleeve member 33'. The closure member 56 acts as a terminal and can be connected to the electrode 13 in any suitable manner. As shown, an adaptor 60 is threaded to a projecting lug 61 of the closure member and an electrode-energizing wire 62 is clamped between washers 63 and 63' held in place by a nut 64 surrounding a threaded lug 65 of the adaptor.

The threaded connection between the upper end 29 and the collar member 40 and between the lower end 29' and the closure member 56 cannot always be relied upon to seal opposite ends of the central passage 32 from the oil zone. It is a feature of the invention that auxiliary sealing means is provided for one or both of these junctions. These sealing means are preferably of similar construction and a detailed description of the upper one will generally suffice to describe both.

Referring particularly to FIG. 2, the collar member 40 provides a skirt 68 depending around the upper neck 27 to provide therebetween a long and narrow annular space which extends upward from the bottom of the skirt to a shoulder 69 of the collar member. The upper end of this annular space provides a packing space filled with a suitable packing means shown as comprising packing rings 72 of the V or chevron type stacked one on another. At the top of the stack is a female adaptor ring 73 engaging the shoulder 69. A male adaptor ring 74 is at the bottom of the stack engaged by a washer 75. The rings 72, 73 and 74 may be of any suitable material but a plastic such as Teflon is preferred. The lower end of the annular space forms a spring space containing a spring 76 that presses the washer 75 upward and compacts the sealing rings 72 against the exposed periphery of the neck 27. By such a structure the upper neck 27 lies in an inner annular zone of a long and radially-narrow annular space bounded inwardly by the outer surface of the sleeve member 33, outwardly by the inner surface of the skirt 68 and endwardly by the flange 35. An outer annular zone of such annular space forms the packing space and the spring space disposed end to end, these spaces respectively containing the packing rings 72 and the spring 76.

The pressure exerted by the spring 76 is such as to tend to cause plastic flow of the material of which the neck 27 is made. It is an important feature of the invention to avoid such plastic flow as would deform the plastic material into the spring space. In this connection an outer sleeve member 80 surrounds the neck 27 at a position spaced below the threaded end 29 thereof thereby leaving exposed a substantial peripheral portion of the neck beyond the upper end of the outer sleeve member 80 for engagement by the packing rings 72. In its preferred form the sleeve member 80 may be a section of thin-walled metal tubing pressed over the neck 27 of a length sufficient to traverse the entire spring space and extend a distance beyond the skirt 68. The lower end of the sleeve member preferably terminates inside or beyond a gland member 82 threaded into the lower end of the skirt to compress the spring and thus apply pressure to the packing rings 72. The sleeve member 80 confines the material of the neck 27 against plastic flow longitudinally of the sleeve member or into the spring space when the spring exerts the desired high pressure on the sealing rings and through them on the material of the neck itself. In addition the inner sleeve member 33 forms a backing for the plastic material of the neck and prevents collapse thereof by the pressure exerted by the spring or the ambient pressure in the oil zone. In this latter connection it is significant that the sleeve member 33 supports the reduced-thickness neck 27 throughout its length.

It will be readily apparent that if plastic flow of the neck material were not avoided such flow would relieve the compression exerted by the spring thereby destroying the effectiveness of the seal and permitting the bushing to leak. The high pressure oil within the container 10 must not leak into the atmosphere through the inlet bushing as this would create an extremely dangerous explosion hazard.

In the preferred embodiment the lower portion of the tubular member 25 is sealed in substantially an identical manner. Thus, the closure member 56 is shown as providing an upstanding skirt 68' providing a packing space containing packing rings 72' between the adaptor rings 73' and 74' and providing a spring space containing a spring 76' compressed by a gland 82', all related to the corresponding elements previously described and coacting in similar manners. Likewise plastic flow of the material of the neck 27' into the spring space is prevented by an outer sleeve member 80' similar to the member 80 previously described.

For a number of reasons it is desirable to make the annular sealing spaces relatively narrow in radial dimension. By using the proportions shown the entire bushing can be moved into place through the opening 41 of the wall 21, a very desirable feature. A small radial dimension of the sealing spaces makes this result possible. In addition, such small radial dimension is very desirable if the sealing rings 72, 72' and the adaptor rings 73, 73', 74, 74' are made of Teflon or other material having a high thermal coefficient of expansion. Use of a narrow packing space avoids excessive cubical expansion of such materials with attendant excessive pressures on the spring, the packing material and the plastic material of the tubular member 25 when the equipment is brought up to operating temperature. Likewise a narrow packing space avoids the large cubical contraction that would take place in larger spaces as the temperature decreases and which might not be properly compensated by the action of the spring.

By the same token, however, a narrow packing space requires particular attention to the design of a suitable spring which can be placed in a spring space that is equally narrow. It is difficult or impossible to design an ordinary coil spring to fit within such a small space and yet produce the necessary pressure on the packing rings. For this and other purposes a special spring 76, 76' has been developed, illustrated in FIGS. 4–6. This spring is composed of a plurality of spring washer elements one of which is shown in FIGS. 5 and 6. These are peripherally undulating rings 85 formed of spring material deformed to provide a plurality of peripherally spaced upper crests 86 with intervening lower crests 87. Such rings are stacked in offset relation so that the upper crests 86 of one ring are below the lower crests 87 of a superimposed ring as suggested in FIG. 4. The contacting upper and lower crests are tack-welded as suggested at 88, using techniques that do not draw the temper of the spring material. All such junctions need not be welded but sufficient thereof should be joined to produce a unitary spring. Such a spring has the property of developing in a small space a strong bias that changes only a relatively small amount with changes in length encountered in use.

All voids within the structure are preferably filled with coatings of silicone grease applied to all engaging surfaces of the elements before assembly. Excess grease will escape through the small holes of the closure members 46 and 56 before the connections are soldered thereto.

The present invention has made it possible to produce a high-voltage entrance bushing that will successfully withstand much higher temperatures and pressures than previous commercial designs. This is because of the materials and relationships of the new structure but while a preferred embodiment has been described various changes and modifications within the scope of the appended claims will be apparent to those skilled in the art.

I claim:

1. A high-voltage insulator structure including in combination: inner, outer and end walls formed of metal defining a long and radially-narrow annular space having inner and outer annular zones; a tubular member having a neck extending into said inner annular zone around said inner wall, said tubular member being formed of a solid plastic material subject to plastic flow upon increase in pressure and temperature, said outer annular zone forming a packing space and a spring space disposed end to end; packing means filling said packing space between said outer wall and the periphery of said neck of said plastic tubular member and engaging such periphery substantially throughout the length of said packing space; a heavy spring in said spring space compressing said packing means in said packing space; and a metal sleeve member within said spring space in confining contact with the periphery of said neck and forming a barrier separating such periphery from said spring, said metal sleeve member terminating at one end of said packing means to leave said periphery of said neck exposed in said packing space for engagement with said packing means.

2. A high-voltage insulator structure including in combination: inner, outer and end walls formed of metal defining a long and radially-narrow annular space and having inner and outer annular zones; a tubular member having a neck extending into said inner annular zone around said inner wall, said tubular member being formed of a plastic material subject to plastic flow upon increase in pressure and temperature, said outer annular zone forming a packing space and a spring space disposed end to end; packing means filling said packing space between said outer wall and the periphery of said neck of said plastic tubular member; a heavy spring in said spring space compressing said packing means in said packing space; a metal sleeve member within said spring space in confining contact with the periphery of said neck and forming a barrier separating such periphery from said spring, said metal sleeve member being carried by said neck of said tubular member and being spaced from said inner, outer and end walls; and a gland member extending into said end of said annular space in compressing relationship with said spring, said metal sleeve member being disposed between said gland member and said neck of said tubular member and extending to a position outside said annular space.

3. A high-voltage insulator structure including in comnation: inner, outer and end walls formed of metal defining a long and radially-narrow annular space having inner and outer annular zones, said outer wall having a threaded portion; a tubular member having a neck extending into said inner annular zone around said inner wall, said neck having an externally threaded section threadedly received by said threaded portion of said outer wall, said tubular member being formed of a plastic material subject to plastic flow upon increase in pressure and temperature, said outer annular zone forming a packing space and a spring space disposed end to end; packing means filling said packing space between said outer wall and the periphery of said neck of said plastic tubular member, a heavy spring in said spring space compressing said packing means in said packing space; and a metal sleeve member within said spring space in confining contact with the periphery of said neck and forming a barrier separating such periphery from said spring.

4. A high-voltage insulator structure including in combination: inner, outer and end walls formed of metal defining a long and radially-narrow annular space having inner and outer annular zones; a tubular member having a neck extending into said inner annular zone around said inner wall, said tubular member being formed of a plastic material subject to plastic flow upon increase in pressure and temperature, said outer annular zone forming a packing space and a spring space disposed end to end; packing means filling said packing space between said outer wall and the periphery of said neck of said plastic tubular member; a heavy spring in said spring space compressing said packing means in said packing space, said heavy spring comprising a plurality of peripherally undulating rings of spring material each providing a plurality of upper crests with intervening lower crests, said ring being stacked in offset relation with the upper crests of at least one ring being below the lower crests of a superimposed ring; and a metal sleeve member within said sleeve space in confining contact with the periphery of said neck and forming a barrier separating such periphery from said spring.

5. In combination with electric equipment having an oil zone subject to extreme changes in pressure and temperature, said oil zone being bound by a wall having an opening therein, a high-voltage inlet bushing including in combination: a collar member adapted to close said opening, said collar member having a skirt extending into said oil zone and a shoulder extending inwardly of said skirt; a plastic tubular member that softens and substantially expands upon increase in temperature and is subject to plastic flow upon increase in pressure, said tubular member having a body portion terminating at one end in a neck sized to extend into said skirt to said collar member to provide a long and narrow annular space within said skirt around said neck extending to said shoulder; a metal closure for the other end of said plastic tubular member; an inner metal sleeve member extending within said neck of said plastic tubular member throughout the length of said skirt to confine the material of said neck against inward deformation by high external pressure in said oil zone; packing means in said annular space adjacent said shoulder; a spring in said annular space compressing said packing against said shoulder, against said skirt and against the exterior of said neck of said plastic tubular member; an outer metal sleeve member around said exterior of said neck separating same from the zone of said spring to confine the plastic of said neck against plastic flow into said spring zone under the action of said spring; and a high-voltage conductor extending through said tubular member to said metal closure thereof.

6. A combination as defined in claim 5 in which said neck of said tubular member is of lesser external diameter than said body portion thereof, the maximum diameter of said body portion and said skirt being less than the diameter of said collar member whereby said skirt and said body portion can be inserted into said oil zone through said opening of said wall.

7. A combination as defined in claim 5 in which said neck of said tubular member is of lesser external diameter than said body portion thereof and is integral therewith at a junction zone, said inner metal sleeve member extending past said junction zone and terminating within said larger body portion.

8. A combination as defined in claim 5 in which said collar member provides an internally threaded passage and in which said neck has an externally threaded section threadedly received by said internally threaded portion.

9. A combination as defined in claim 8 in which said inner metal sleeve member provides a flange extending outward within said internally threaded passage to form an end wall in engagement with an end surface of said neck of said tubular member.

10. A combination as defined in claim 9 including a retainer member threaded in said internally threaded portion engaged by said flange of said inner metal sleeve member.

11. A combination as defined in claim 8 including a second plastic tubular member having one end threaded into said internally threaded portion of said collar, and a second metal closure for the other end of said second tubular member, said high-voltage conductor comprising a length of high-voltage cable extending through both tubular members and having a central conductor exposed at both ends of said length of cable, the exposed ends of said central conductor being respectively connected electrically to said metal closure.

12. In combination with electric equipment having an oil zone subject to extreme changes in pressure and temperature, said oil zone being bounded by a wall having an opening therein, a high-voltage inlet bushing including in combination: a plastic tubular member that softens and expands upon increase in temperature and is subject to plastic flow upon increase in pressure, said tubular member having a central body portion and upper and lower necks at opposite ends thereof terminating in upper and lower attachment means, said tubular member providing a central passage therethrough; upper and lower inner metal sleeve members respectively within the ends of said central passage and traversing the upper and lower necks; upper and lower outer metal sleeve members respectively around the exteriors of said necks at positions spaced inwardly of the upper and lower attachment means to leave exposed upper and lower peripheral portions of said necks between the ends of said outer metal sleeve members and the corresponding attachment means; a collar connected to the upper attachment means of said tubular member, there being means for connecting said collar to said wall in closing relationship with said opening thereof, said collar having a skirt depending around said upper peripheral portion of said upper neck to provide a packing space therebetween and depending around at least a portion of said upper outer sleeve member to provide a spring space therebetween; a metal closure member connected to the lower attachment means of said tubular member and closing the lower end of said central passage thereof, said closure member providing an upstanding skirt extending upward around said lower peripheral portion of said lower neck to provide a lower packing space therebetween and extending upward around at least a portion of said lower outer sleeve member to provide a spring space therebetween; packing means in the respective packing spaces and springs in the respective spring spaces compressing the respective packings; and a high-voltage conductor extending through said central passage having a lower end electrically connected to said closure member.

13. An inlet bushing as defined in claim 12 including a second tubular member having one end connected to said collar and providing a central passage in axial alignment with said central passage of said plastic tubular member, and a second metal closure for the other end of said second tubular member, said high-voltage conductor having an upper end electrically connected to said second closure member.

14. An inlet bushing as defined in claim 13 in which said conductor is the central conductor of a length of high-voltage cable having a sheath of insulating material extending through both tubular members and of an external diameter only slightly less than those of said aligned central passages, said sheath exposing ends of said central conductor providing said lower and upper ends respectively connected to said closure members.

15. In combination with electric equipment having an oil zone subject to extreme changes in pressure and temperature, said oil zone being bounded by a wall having an opening therein, a high-voltage inlet bushing including in combination: a collar member adapted to close said opening, said collar member including a skirt having a central axis; a plastic tubular member that softens and substantially expands upon increase in temperature and which is subject to plastic flow upon increase in pressure, said tubular member having a neck portion; means for attaching said plastic tubular member to said collar member with said neck portion extending along said skirt coaxial with said central axis thereof to provide a long and narrow annular space within said skirt around said neck portion comprising a packing space and a spring space disposed end to end; a packing means in said packing space between the inner surface of said skirt and the outer surface of said plastic tubular member; a spring in said spring space compressing said packing means between said surfaces, said plastic tubular member having a central passage therethrough with a counterbore extending inward from one end thereof; an inner sleeve member formed of metal fitting in said counterbore and extending therein from such one end thereof to a position inwardly beyond said packing space to support the material of said neck portion against inward displacement by pressure exerted on said neck portion by said packing means; a metal closure member closing the other end of said central passage; and a conductor within said central passage electrically connected to said closure member.

16. In combination with electric equipment having an oil zone subject to extreme changes in pressure and temperature, said oil zone being bounded by a wall having an opening therein, a high-voltage inlet bushing including in combination: a collar member adapted to close said opening, said collar member including a skirt having a central axis, said skirt having an internally-threaded portion; a plastic tubular member made of a material that softens and substantially expands upon increase in temperature and which is subject to plastic flow upon increase in pressure, said tubular member having a neck portion; means for attaching and sealing said plastic tubular member to said collar member with said neck portion extending along said skirt coaxial with said central axis thereof, said attaching and sealing means including an externally threaded portion of said neck portion threaded tightly into said internally-threaded portion of said skirt, said plastic tubular member having a central passage therethrough having one end opening on a space within said collar member; an inner sleeve member formed of metal fitting in said central passage and extending from a position at said one end thereof toward the center of said plastic tubular member to a position beyond said attaching and sealing means to support the material of said neck portion against inward displacement by the pressure of said oil zone exerted externally on said neck portion, said inner sleeve member providing a flange extending outwardly in said space and overlying the end of said neck portion; a metal closure member closing the other end of said central passage, and a conductor within said central passage electrically connected to said closure member.

References Cited in the file of this patent
UNITED STATES PATENTS 2,651,672    Ivanoff _____ Sept. 8, 1953

FOREIGN PATENTS 826,258    France _____ Jan. 4, 1938